United States Patent
Elshafie et al.

(10) Patent No.: US 12,088,417 B2
(45) Date of Patent: Sep. 10, 2024

(54) QUANTIZED CQI FEEDBACK FOR HARQ BASED RETRANSMISSIONS

(71) Applicant: QUALCOMM Incorporated, San Diego, CA (US)

(72) Inventors: Ahmed Elshafie, San Diego, CA (US); Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 17/322,864

(22) Filed: May 17, 2021

(65) Prior Publication Data
US 2021/0359795 A1 Nov. 18, 2021

Related U.S. Application Data

(60) Provisional application No. 63/026,685, filed on May 18, 2020.

(51) Int. Cl.
*H04L 1/1812* (2023.01)
*H04B 7/0417* (2017.01)
(Continued)

(52) U.S. Cl.
CPC ......... *H04L 1/1819* (2013.01); *H04B 7/0417* (2013.01); *H04B 7/0626* (2013.01);
(Continued)

(58) Field of Classification Search
CPC ... H04L 5/0053; H04L 5/0055; H04L 5/0057; H04L 1/0026; H04L 1/1812;
(Continued)

(56) References Cited

U.S. PATENT DOCUMENTS 11,122,549 B2   9/2021 Huang et al.
2016/0254899 A1  9/2016 Hwang et al.
(Continued)

FOREIGN PATENT DOCUMENTS

CN   105684337 A   6/2016
CN   111357225 A   6/2020
(Continued)

OTHER PUBLICATIONS

International Search Report and Written Opinion—PCT/US2021/032898—ISA/EPO—Aug. 10, 2021.
(Continued)

*Primary Examiner* — Peter Chen
(74) *Attorney, Agent, or Firm* — Arun Swain

(57) ABSTRACT

Aspects of the present disclosure relate to wireless communications, and more particularly, to techniques for providing quantized channel state information (CSI) feedback that may be used to adjust transmission parameters for retransmissions after a negative acknowledgment. An example method performed by a user equipment (UE) generally includes generating hybrid automatic repeat request (HARQ) feedback for a downlink transmission from a network entity, generating quantized channel state information (CSI) feedback, transmitting the HARQ feedback and quantized CSI feedback to the network entity in a physical uplink control
(Continued)

channel (PUCCH) transmission, and processing a retransmission of the downlink transmission, sent with transmission parameters adjusted based on the quantized CSI feedback if the HARQ feedback indicates a decoding failure.

28 Claims, 16 Drawing Sheets

(51) Int. Cl.
    *H04B 7/06* (2006.01)
    *H04B 17/336* (2015.01)
    *H04L 1/1867* (2023.01)
(52) U.S. Cl.
    CPC ......... *H04B 7/0632* (2013.01); *H04B 17/336* (2015.01); *H04L 1/1896* (2013.01)
(58) Field of Classification Search
    CPC ... H04L 1/1816; H04L 1/1819; H04L 1/1896; H04B 7/0417; H04B 7/0626; H04B 7/0632; H04B 17/336; H04W 72/20; H04W 72/21; H04W 72/23
    See application file for complete search history.

(56) References Cited

U.S. PATENT DOCUMENTS

| | | | |
|---|---|---|---|
| 2017/0201308 A1* | 7/2017 | Park | H04W 16/14 |
| 2019/0229883 A1* | 7/2019 | Hwang | H04L 5/0055 |
| 2019/0260451 A1 | 8/2019 | Sarkis et al. | |

FOREIGN PATENT DOCUMENTS

| | | |
|---|---|---|
| WO | 2018058600 A1 | 4/2018 |
| WO | 2019099794 | 5/2019 |
| WO | 2020025109 A1 | 2/2020 |

OTHER PUBLICATIONS

Samsung: "CSI Reporting for NR", 3GPP Draft, R1-164011 CSI Reporting for NR_MIMO V3, 3rd Generation Partnership Project (3GPP), Mobile Competence Centre, 650, Route Des Lucioles, F-06921 Sophia-Antipolis Cedex, France, vol. RAN WG1, No. Nanjing, China, May 23-May 27, 2016, 6 Pages, May 13, 2016 (May 13, 2016), XP051090297, Retrieved from the Internet: URL: http://www.3gpp.org/ftp/tsg_ran/WG1_RL1/TSGR1_85/Docs/ [retrieved on May 13, 2016] the whole document.

* cited by examiner

< 38.214 - Table 5.1.3.1-1: MCS Index Table 1 for PDSCH >

| MCS Index $I_{MCS}$ | Modulator Order $Q_m$ | Target Code Rate x [1024] R | Spectral Efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved | |
| 30 | 4 | Reserved | |
| 31 | 6 | Reserved | |

FIG. 10

| Bits | Representation |
|---|---|
| $x = (00)_b \to x = (0)_d$, $Q_{m,new} = 2(x+1) = 2*1 = 2$ | Use Modulation Order 2 |
| $x = (01)_b \to x = (1)_d$, $Q_{m,new} = 2*2 = 4$ | Use Modulation Order 4 |
| $x = (10)_b \to x = (2)_d$, $Q_{m,new} = 2*3 = 6$ | Use Modulation Order 6 |
| $x = (11)_b \to x = (3)_d$, $Q_{m,new} = 2*4 = 8$ | Use Modulation Order 8 (in Case, 256QAM is Allowed) |

FIG. 11

Table 5.2.2.1-2: 4-Bit CQI Table

| CQI index | Modulation | Code Rate x 1024 | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 12A

Table 5.2.2.1-3: 4-Bit CQI Table 2

| CQI Index | Modulation | Code Rate x 1024 | Efficiency |
|---|---|---|---|
| 0 | Out of Range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

FIG. 12B

| Bits Values $b_2b_3$ | Representation |
|---|---|
| (00)$_b$ | Use Modulation Order 2 |
| (01)$_b$ | Use Modulation Order 4 |
| (10)$_b$ | Use Modulation Order 6 |
| (11)$_b$ | Use Modulation Order 8 (in Case, 256QAM is Allowed) |

FIG. 13A

| Bits values $b_0b_1$ | Carried Info |
|---|---|
| (00)$_b$ | DTX (UE Miss Detected the DCI Scheduling the PDSCH. UE Just Report it Missed DCI. The CQI Update Info is N/A Here) |
| (01)$_b$ | ACK |
| (10)$_b$ | NACK + #RE is Same ($\alpha = 1$) |
| (11)$_b$ | NACK + #RE is Double ($\alpha = 2$) |

FIG. 13B

| Bits values $b_0b_1$ | Carried Info |
|---|---|
| $(00)_b$ | ACK + current #RE/RB − $X_1$ |
| $(01)_b$ | ACK + current #RE/RB − $Y_1$ |
| $(10)_b$ | NACK + current #RE/RB + $X_2$ |
| $(11)_b$ | NACK + current #RE/RB + $Y_2$ |

FIG. 13C

QUANTIZED CQI FEEDBACK FOR HARQ BASED RETRANSMISSIONS

PRIORITY CLAIM(S)

This application claims benefit of and the priority to U.S. Provisional Application No. 63/026,685, filed on May 18, 2020, which is expressly incorporated by reference in its entirety as if fully set forth below and for all applicable purposes.

BACKGROUND

Aspects of the present disclosure relate to wireless communications, and more particularly, to techniques for providing quantized channel state information (CSI) feedback that may be used to adjust transmission parameters for retransmissions after a negative acknowledgment.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes generating hybrid automatic repeat request (HARQ) feedback for a downlink transmission from a network entity, generating quantized channel state information (CSI) feedback, transmitting the HARQ feedback and quantized CSI feedback to the network entity in a physical uplink control channel (PUCCH) transmission, and processing a retransmission of the downlink transmission, sent with transmission parameters adjusted based on the quantized CSI feedback if the HARQ feedback indicates a decoding failure.

Certain aspects of the present disclosure are directed to an apparatus for wireless communication by a UE. The apparatus generally includes a memory and at least one processor coupled to the memory, the memory and the at least one processor being configured to generate HARQ feedback for a downlink transmission from a network entity, generate quantized CSI feedback, transmit the HARQ feedback and quantized CSI feedback to the network entity in a PUCCH transmission, and process a retransmission of the downlink transmission, sent with transmission parameters adjusted based on the quantized CSI feedback if the HARQ feedback indicates a decoding failure.

Certain aspects of the present disclosure are directed to an apparatus for wireless communication by a UE. The apparatus generally includes means for generating HARQ feedback for a downlink transmission from a network entity, means for generating quantized CSI feedback, means for transmitting the HARQ feedback and quantized CSI feedback to the network entity in a PUCCH transmission, and means for processing a retransmission of the downlink transmission, sent with transmission parameters adjusted based on the quantized CSI feedback if the HARQ feedback indicates a decoding failure.

Certain aspects of the present disclosure are directed to a computer readable medium having instructions stored thereon for generating HARQ feedback for a downlink transmission from a network entity, generating quantized CSI feedback, transmitting the HARQ feedback and quantized CSI feedback to the network entity in a PUCCH transmission, and processing a retransmission of the downlink transmission, sent with transmission parameters adjusted based on the quantized CSI feedback if the HARQ feedback indicates a decoding failure.

Certain aspects of the present disclosure provide a method for wireless communications by a network entity. The method generally includes receiving, from a UE a PUCCH transmission conveying HARQ feedback for a previous downlink transmission from the network entity and quantized CSI feedback, adjusting one or more transmission parameters used for the previous downlink transmission based on the quantized CSI feedback, and retransmitting the downlink transmission with the adjusted transmission parameters if the HARQ feedback indicates a decoding failure.

Certain aspects of the present disclosure are directed to an apparatus for wireless communication by a network entity. The apparatus generally includes a memory and at least one processor coupled to the memory, the memory and the at least one processor being configured to receive, from a UE a PUCCH transmission conveying HARQ feedback for a previous downlink transmission from the network entity and quantized CSI feedback, adjust one or more transmission parameters used for the previous downlink transmission based on the quantized CSI feedback, and retransmit the downlink transmission with the adjusted transmission parameters if the HARQ feedback indicates a decoding failure.

Certain aspects of the present disclosure are directed to an apparatus for wireless communication by a network entity. The apparatus generally includes means for receiving, from a UE a PUCCH transmission conveying HARQ feedback for a previous downlink transmission from the network entity and quantized CSI feedback, means for adjusting one or more transmission parameters used for the previous downlink transmission based on the quantized CSI feedback, and means for retransmitting the downlink transmission with the adjusted transmission parameters if the HARQ feedback indicates a decoding failure.

Certain aspects of the present disclosure are directed to a computer readable medium having instructions stored thereon for receiving, from a UE a PUCCH transmission conveying HARQ feedback for a previous downlink transmission from the network entity and quantized CSI feedback, adjusting one or more transmission parameters used for the previous downlink transmission based on the quantized CSI feedback, and retransmitting the downlink transmission with the adjusted transmission parameters if the HARQ feedback indicates a decoding failure.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 10 illustrates an example MCS index table with information that may be quantized, in accordance with certain aspects of the present disclosure.

FIG. 11 illustrates an example of quantized CSI feedback bit values, in accordance with certain aspects of the present disclosure.

FIGS. 12A and 12B illustrate CQI tables with information that may be quantized, in accordance with certain aspects of the present disclosure.

FIGS. 13A, 13B, and 13C illustrate examples of quantized CSI feedback bit values, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
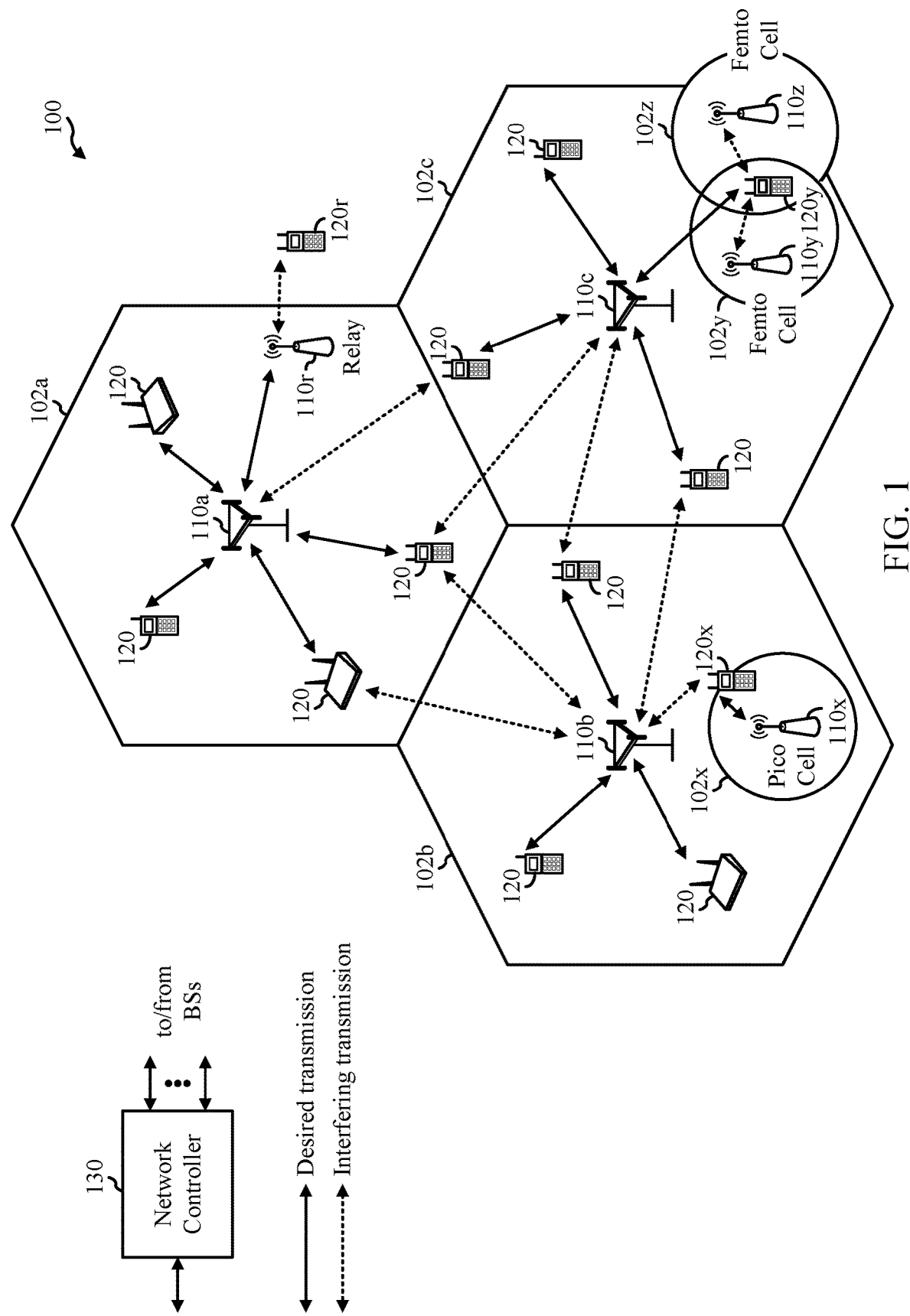
FIG. 1 is a block diagram conceptually illustrating an example telecommunications system, in accordance with certain aspects of the present disclosure.

Aspects of the present disclosure relate to wireless communications, and more particularly, to techniques for providing quantized channel state information (CSI) feedback that may be used to adjust transmission parameters, for example, for retransmissions after a negative acknowledgment (NACK).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 700 of FIG. 7 to provide quantized CSI feedback for HARQ-based retransmissions. Similarly, the wireless network 100 may include a base station 110 configured to perform operations 800 of FIG. 8 to receive and process quantized CSI feedback received from a UE (performing operations 700 of FIG. 7).

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
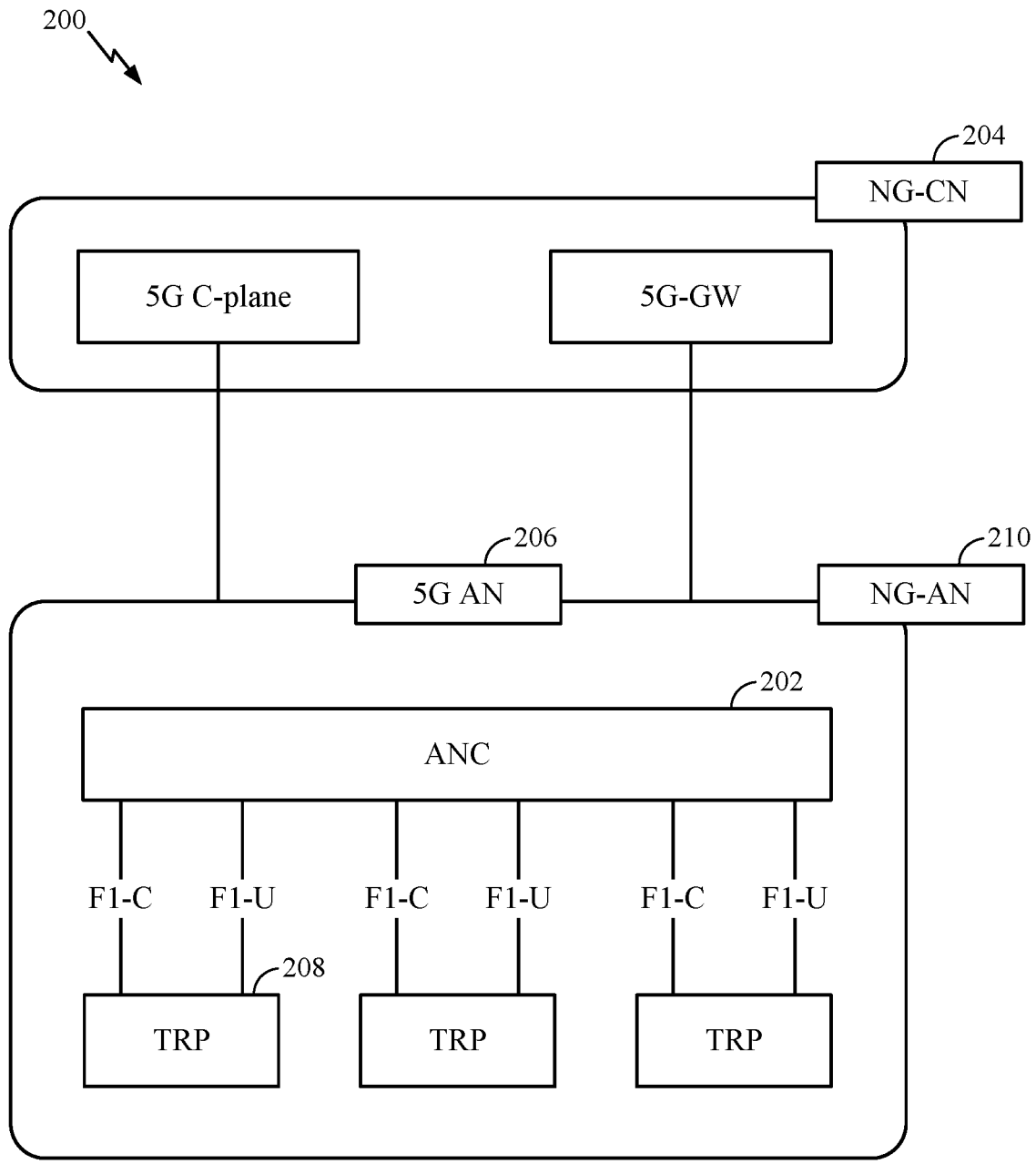
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support various backhauling and fronthauling solutions. This support may occur via and across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
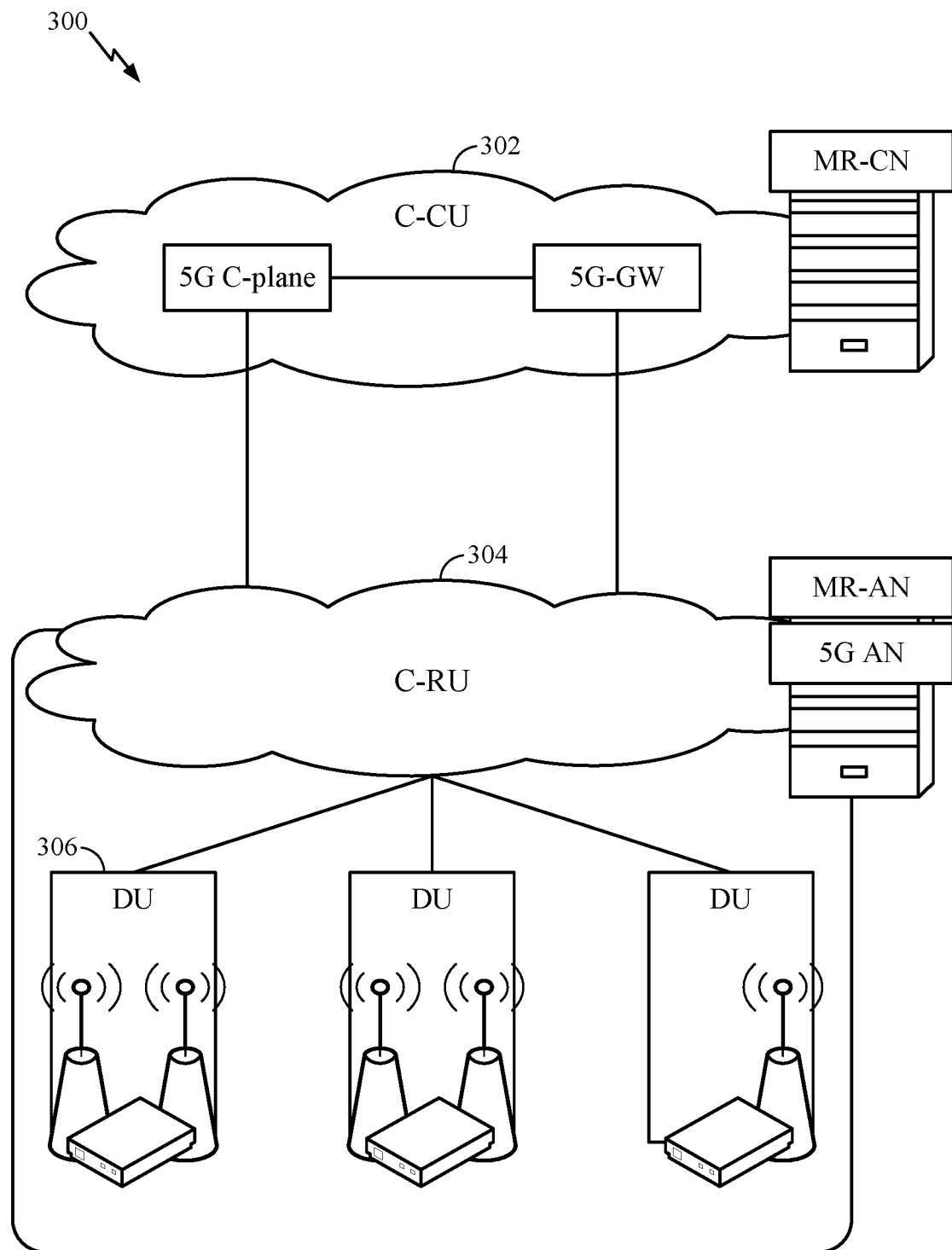
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
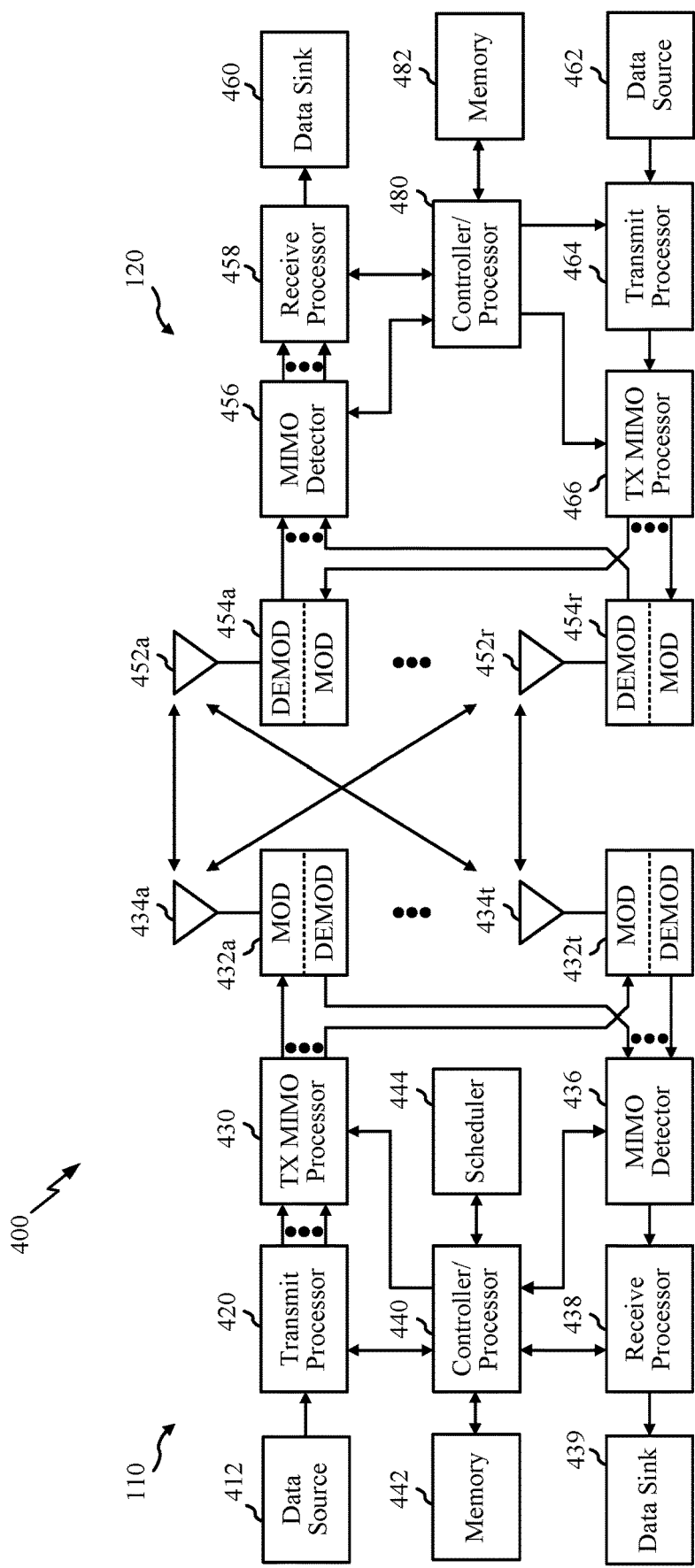
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480, which may include a feedback component 481, of the UE 120 may be used to perform operations 700 of FIG. 7, while antennas 434, processors 420, 460, 438, and/or controller/processor 440, which may include a feedback component 441, of the BS 110 may be used to perform operations 800 of FIG. 8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, antennas 452a through 452r may receive downlink signals from the base station 110 and may provide received signals to demodulators (DEMODs) in transceivers 454a through 454r, respectively. Each demodulator 454 may condition (e.g., filter, amplify, down convert, and digitize) a respective received signal to obtain input samples. Each demodulator may further process input samples (e.g., for OFDM, etc.) to obtain received symbols. A MIMO detector 456 may obtain received symbols from all demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct operations at the base station 110 and the UE 120, respectively. The processor 440 and/or other processors and modules at the BS 110 may perform or direct execution of processes for techniques described herein. The memories 442 and 482 may store data and program codes for BS 110 and UE 120, respectively. A scheduler 444 may schedule UEs for data transmission on the downlink and/or uplink.

Figure 5:
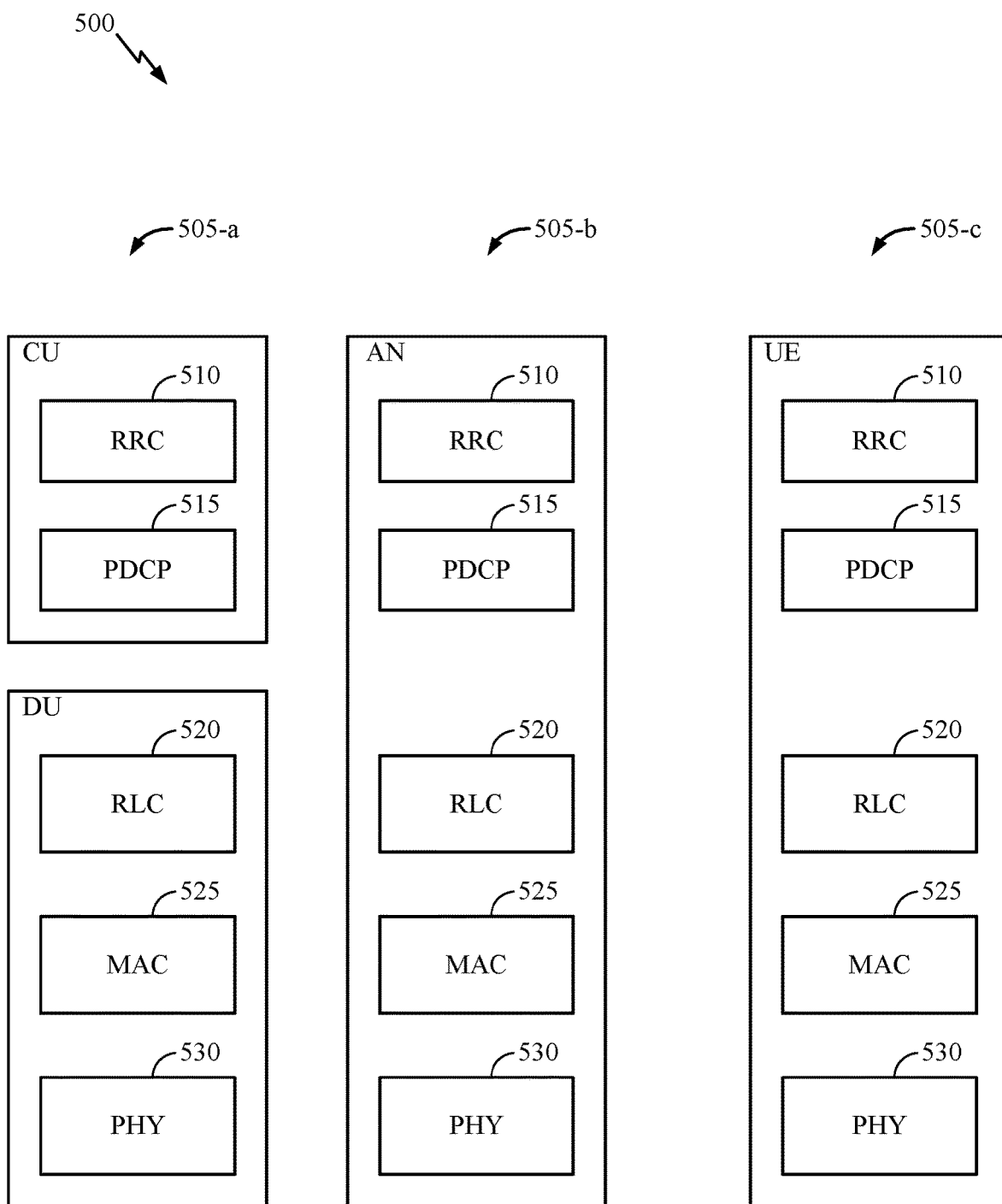
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
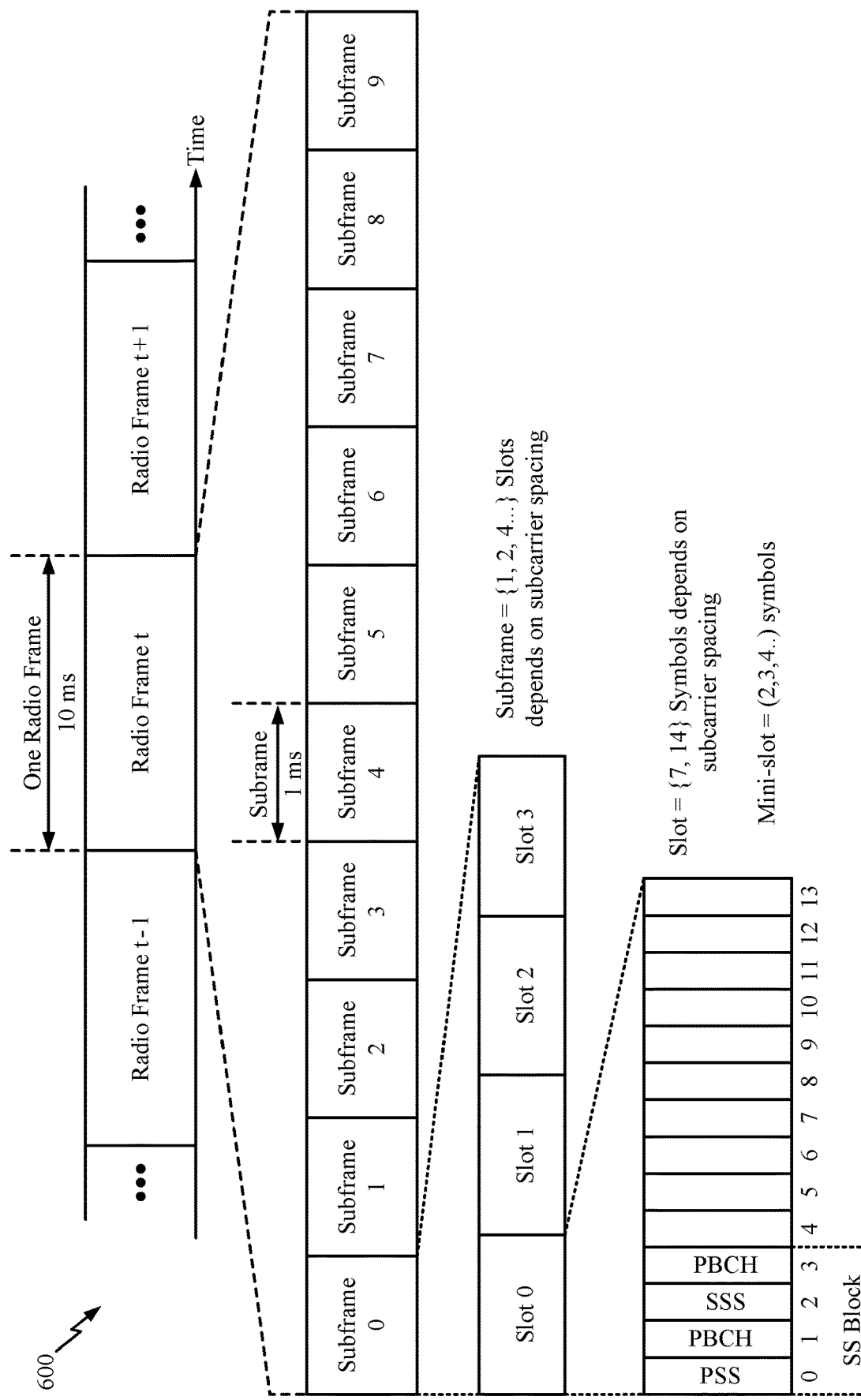
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Example Quantized CQI Feedback for HARQ Based Retransmissions

Aspects of the present disclosure relate to wireless communications, and more particularly, to techniques for providing quantized channel state information (CSI) feedback that may be used to adjust transmission parameters for retransmissions after a negative acknowledgment (NACK).

The mechanisms proposed herein may help achieve faster channel quality information (CQI) feedback, in an effort to achieve a high degree of reliability with only one retransmission. The initial transmission may be sent with a modulation and coding scheme (MCS) selected based on periodic CQI reports, while the retransmission may be sent with an MCS selected based on (asynchronous) CQI sent along with the ACK/NACK feedback (e.g., what may be considered enhanced ACK feedback).

Figure 7:
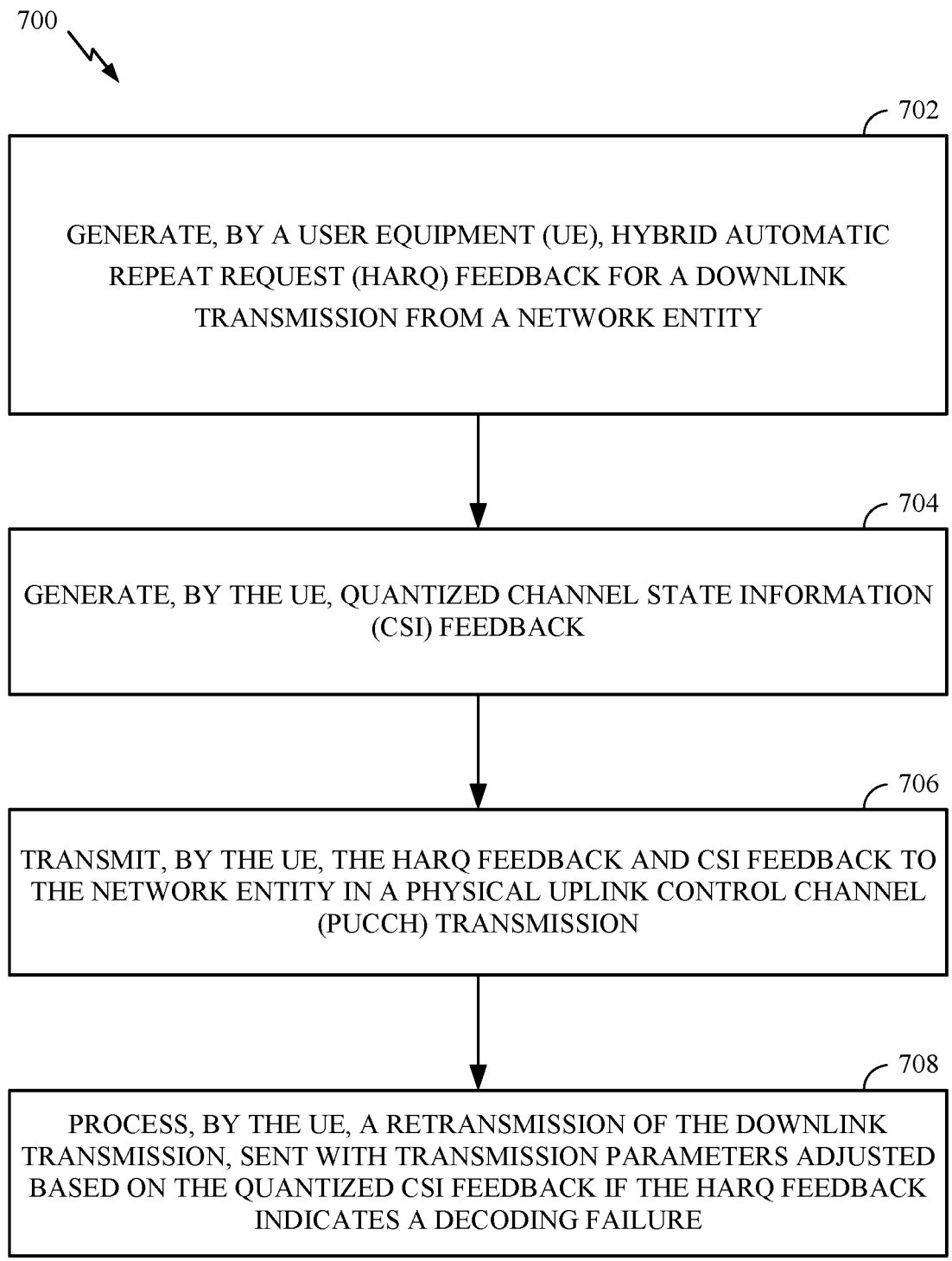
FIG. 7 illustrates example operations for wireless communications by a user equipment (UE), in accordance with certain aspects of the present disclosure.

FIG. 7 illustrates example operations 700 for wireless communications by a UE, in accordance with certain aspects of the present disclosure. For example, operations 700 may be performed by a UE 120 of FIG. 1 and/or FIG. 4 to provided quantized CSI feedback.

Operations 700 begin, at 702, by generating hybrid automatic repeat request (HARQ) feedback for a downlink transmission from a network entity.

At 704, the UE generates quantized CSI feedback. At 706, the UE transmits the HARQ feedback and quantized CSI feedback to the network entity in a physical uplink control channel (PUCCH) transmission. For example, the UE may generate one or more bits of quantized feedback in accordance with the tables shown in FIGS. 11, 13A, and 13B.

At 708, the UE processes a retransmission of the downlink transmission, sent with transmission parameters adjusted based on the quantized CSI feedback if the HARQ feedback indicates a decoding failure.

Figure 8:
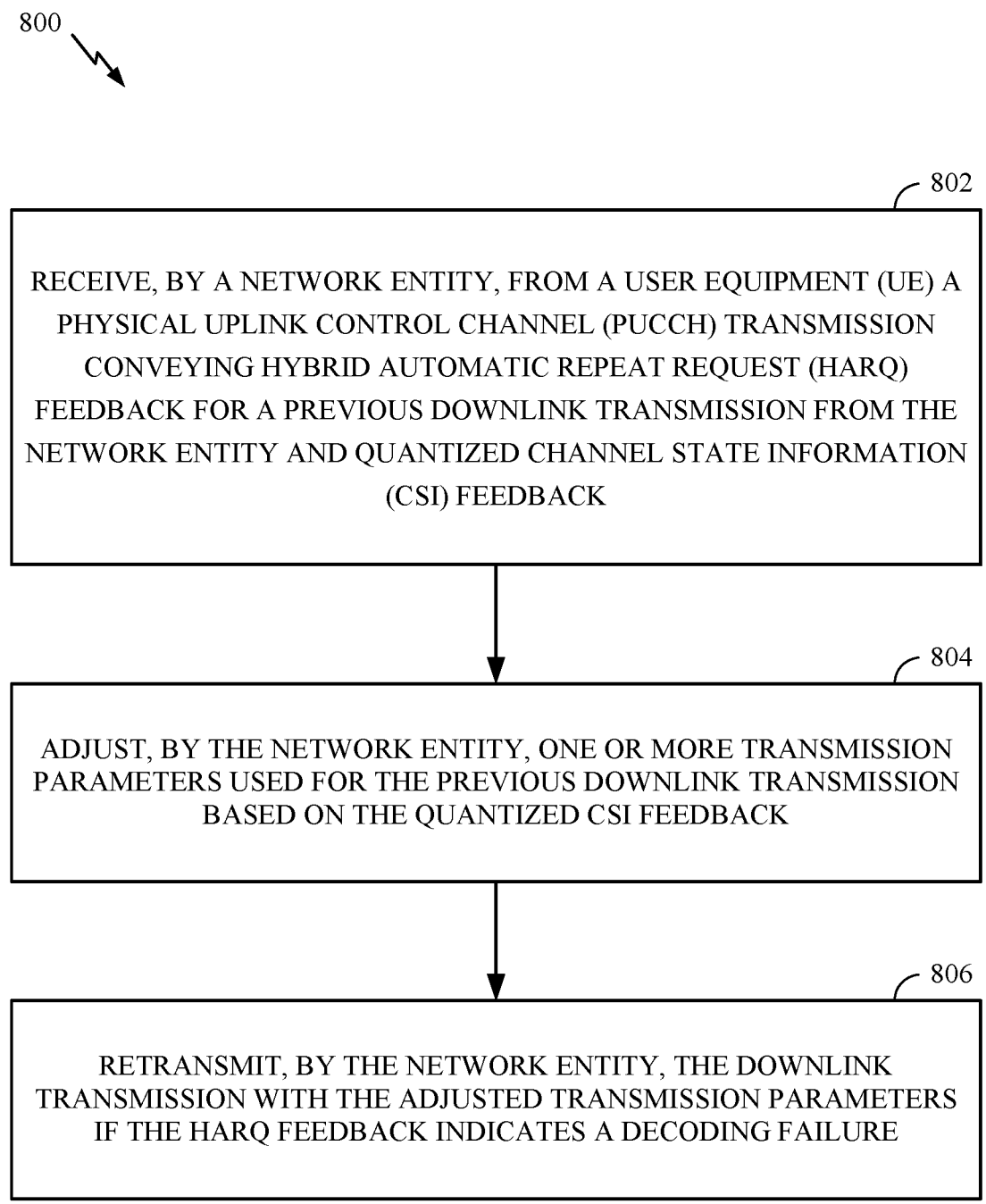
FIG. 8 illustrates example operations for wireless communications by a network entity, in accordance with certain aspects of the present disclosure.

FIG. 8 illustrates example operations 800 for wireless communications by a network entity and may be considered complementary to operations 700 of FIG. 7. For example, operations 800 may be performed by a gNB to process quantized CSI feedback received from a UE performing operations 700 of FIG. 7. Additionally, operations 800 may be performed by a BS 110 of FIG. 1 and/or FIG. 4 to perform a retransmission based on received quantized CSI feedback.

Operations 800 begin, at 802, by receiving, from a UE a PUCCH transmission conveying HARQ feedback for a previous downlink transmission from the network entity and quantized CSI feedback. At 804, the network entity adjusting one or more transmission parameters used for the previous downlink transmission based on the quantized CSI. At 806, the network entity retransmitting the downlink transmission with the adjusted transmission parameters if the HARQ feedback indicates a decoding failure.

Figure 9:
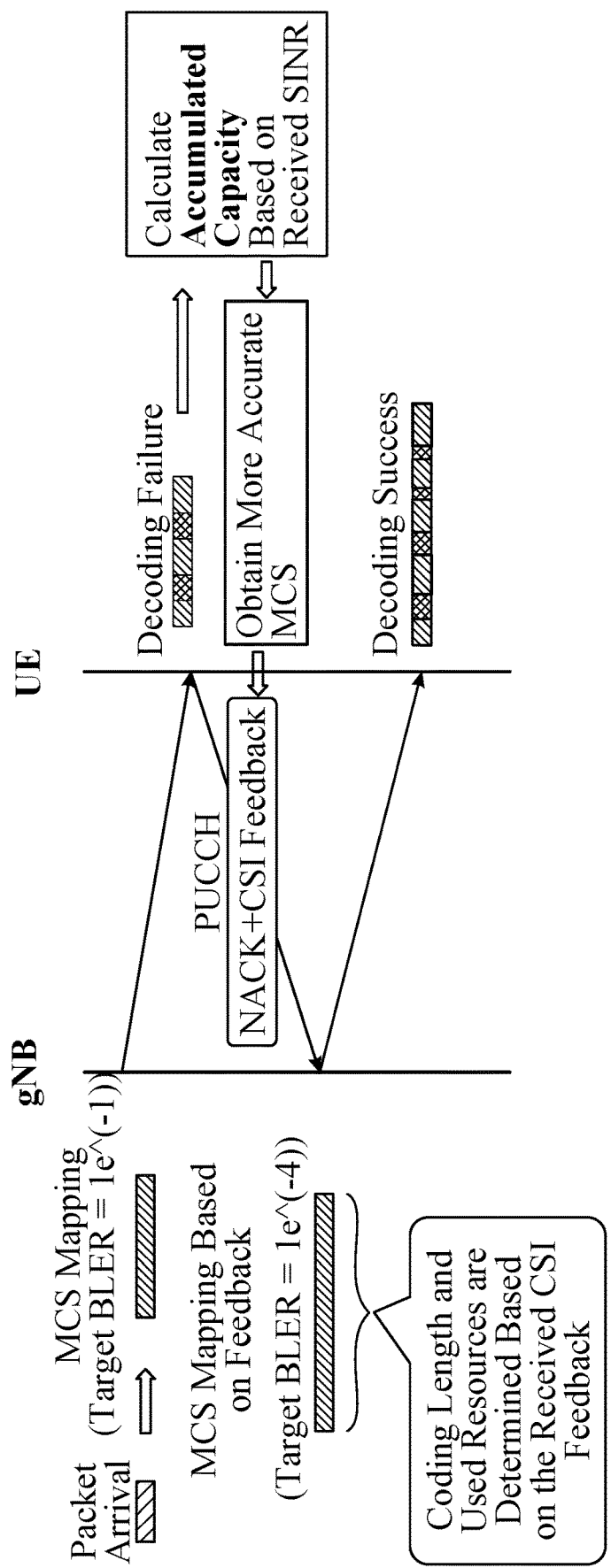
FIG. 9 illustrates an example of quantized CSI feedback, in accordance with certain aspects of the present disclosure.

Operations 700 and 800 of FIGS. 7 and 8 may be described and further understood with reference to the call flow diagram of FIG. 9.

As illustrated, the gNB sends an initial transaction with an MCS selected (e.g., based on periodic CSI reports) to achieve a first target block error rate (e.g., BLER of 0.1 or less). In response to a decoding failure of the initial transmission, the UE generates CSI feedback design to allow the gNB to adjust transmission parameters (e.g., obtain a more accurate MCS) and provides the CSI feedback with the NACK.

The gNB then adjusts transmission parameters for the retransmission to meet a more stringent target BLER (e.g., 0.0001 or less). As indicated, the gNB may also determine parameters, such as coding length and other resources to use for the retransmission based on the quantized CSI feedback.

The quantized feedback, provided together with the NACK, may help the gNB select an accurate MCS, resource allocation, Tx beam, and the like to meet a target reliability (e.g., 0.0001 error rate) for retransmissions (ReTx). The additional information provided by the quantized feedback could be downlink control information (DCI) mis-detection (DTX) and/or CQI information.

In general, the feedback may be provided in uplink control information (UCI) with two stages/parts. The first part may correspond to the conventional type HARQ-ACK feedback (e.g., indicating a DTX, ACK, or NACK). In the case of a NACK in the first part, the second part may be CSI information associated with the NACK.

The quantized feedback is an efficient mechanism to provide feedback, and there are various options regarding the particular format of the quantized feedback. For example, while conventional feedback for a CQI table with 16 entries would normally require 4 bits to feed back the CQI, quantized feedback may require fewer bits.

As an example, to follow current gNB implementations in case of retransmissions for non-turbo HARQ cases, the UE may simply report a new modulation order to the gNB (rather than the modulation order and code rate). For example, the UE may provide 2 bits that indicate one of 4 modulation orders, while it is then up to the gNB to choose the other parameters to maintain the transport block (TB) size to be the same and help ensure lower BLER.

The TB size may be maintained by selecting parameters according to the MCS table shown in FIG. 10, based on the following equation:

$$N_{info}=N_{RE}N_LQ_mR,$$

where $N_{RE}$ is the number of reference elements (REs), $N_L$ is the number of layers, $Q_m$ is the modulation order, and R is the code rate. To maintain a fixed TB size, the gNB may fix $N_{info}$. Decreasing $Q_m$ generally causes an increase for either R or $N_{RE}$, whereas increasing $N_{RE}$ is typically more straightforward.

As illustrated in FIG. 11, with this approach, the UE may use just 2 bits of feedback (half the overhead of 4 bits of the conventional approach) to provide an indication of the new modulation order (e.g., one of four modulation orders shown in FIG. 12A or 12B). For example, the new modulation order may be denoted by:

$$Q_{m,new}=2(x+1),$$

where x is the two bit value fed back by the UE to the gNB. As will be described in greater detail below, an additional bit could also be added (e.g., to quantize the code rate).

CQI computation at the UE may be performed as follows. The UE may first compute average SINR per layer, compute spectral efficiency (SPEF), and use a CQI-to-efficiency table (e.g., per FIG. 12A or 12B) to obtain a CQI value. Given the CQI value, the UE may then check the corresponding modulation order and report the modulation order. For example, using just two bits, the UE could report QPSK, 16QAM, or 64QAM, per the table of FIG. 12A, or QPSK, 16QAM, 64QAM, or 256QAM per the table of FIG. 12B.

As noted above, it may be left to the gNB to figure out the suitable MCS among the available values for ReTx. From the gNB perspective, for ReTx, the gNB knows the TBS, and, based on the CQI, the gNB scheduler may need to determine four parameters for the ReTx. The parameters may include the number of resource elements (#REs), the number of layers (#layers), modulation order, and code rate, which satisfy an equation:

$$N_{RE}N_LQ_mR=N_{info}.$$

When using turbo HARQ, it may be assumed that the ReTx uses the same rank as the original Tx. Still, the gNB may need to determine the remaining three parameters (#REs, modulation order, and code rate).

Assuming the 2-bit feedback technique, upon receiving the modulation order indicated by the UE, the gNB may still need to determine the remaining two unknown parameters (the #REs and code rate). Assuming there is no more feedback from UE, other than the NACK and the suggested modulation order, the gNB may check the MCS tables (e.g., shown in FIG. 10) and pick a corresponding code rate.

There are various options the gNB may use to pick a corresponding code rate. For example, a relatively conservative gNB may check the MCS table, and pick the lowest code rate corresponding to the suggested modulation order. On the other hand, a relatively aggressive gNB may pick the highest code rate corresponding to the suggested modulation order. Still, another option is for the gNB to pick some code rate in the middle. The option a gNB uses may depend on a traffic type. For example, for ultra-reliable low latency communication (URLLC) service, the gNB may pick the most conservative code rate.

As noted above, in some cases, the UE may provide an additional feedback bit. In such cases, the bit may indicate a range of code rates for the modulation order indicated in the feedback. For example, the code rates per QAM may be partitioned into an "above median" value or a "below median" value (e.g., from the 64QAM table shown in FIG. 12A, QPSK has 4 points, 16QAM has 3 points, and 64QAM has 6 points). Focusing on the QAM entries, points 1 and 2 could be reported with the additional bit as 0 (e.g., below or equal to 2 is 0), and points above 2 could be reported with the additional bit as 1 (so points 3 and 4 among QPSK are reported as 1).

Thus, assuming the UE computed a CQI index of 4, then using this approach, the UE could provide feedback of two bits indicating QPSK (e.g., 00), and the modulation order feedback is 00 and the code rate is reported as 0. In some cases, the code rate feedback could be part of DTX/ACK/NACK feedback (e.g., taking advantage of the fact there are 2 bits and only these three types of HARQ feedback).

Another way to perform feedback is to indicate a factor of resource increment such as 1×#REs, 2×#REs (to indicate the amount of additional resources, if any, based on a UE's request). The weights of the number of REs can be obtained from the equation:

$N_{info} = N_{RE} R N_L Q_m$, such that $$\frac{N_{RE}^{new} R^{new} Q_m^{new}}{N_{RE}^{old} R^{old} Q_m^{old}} = 1,$$

then assuming:

$N_{RE}^{new} = \alpha N_{RE}^{old}$ then $$\alpha = \left\lceil \frac{N_{RE}^{old} R^{old} Q_m^{old}}{N_{RE}^{old} R^{new} Q_m^{new}} \right\rceil^+ = \left\lceil \frac{R^{old} Q_m^{old}}{R^{new} Q_m^{new}} \right\rceil^+$$

where $\lceil x \rceil^+$ denotes the closest integer greater than the argument and cannot be below 1, where, $\lceil x \rceil^+ = \min(\lceil x \rceil, 1)$. In the equation above, α may be assumed to be either 1 or 2 and, hence, can be represented by 1 bit.

Using this type of feedback, in addition to 2 bits to indicate modulation order, 2 bit feedback with 4 code points may be: DTX, ACK, NACK with 1×#REs (or quantized code rate), or NACK with 2×#REs (or the bit(s) could indicate a quantized code rate as noted above). FIGS. 13A and 13B are tables summarizing this combination of quantized feedback using two bits to indicate a modulation order (FIG. 13A) and an additional bit via '1×' bit values for NACK feedback (FIG. 13B).

Upon receiving the feedback, the gNB knows the number of REs for ReTx, so what the gNB still may need to determine includes: the modulation order and code rate. Since there are only 4 possible modulation orders to enumerate, so the gNB can choose one based on most reasonable combination of (mod order, code rate).

As described herein, the quantization techniques shown in the tables of FIGS. 13A and 13B allow for the entire CQI feedback process for HARQ retransmission to be more efficiently provided as four bits:

$b_0 b_1 b_2 b_3$ where bits $b_0 b_1$ are DTX/ACK/NACK+code rate (or NACK+num RB bits, and bits $b_2 b_3$ are modulation order indication bits. In some cases, the value(s) of α may be configured (e.g., via RRC or MAC CE signaling).

In some cases, rather than signal bit values that indicate a multiple (e.g., 1× or 2×) of the #REs or RBs as shown in FIG. 13B, a more general value may be indicated. For example, a general parameter may be indicated (as positive or negative) to adjust the number of REs/RBs (e.g., to obtain higher or lower SNR based on current channel conditions).

For example, as illustrated in FIG. 13C, the number of REs/RBs may also be adjusted for ACK/NACK feedback. In the illustrated example, 2 bit feedback may indicate one of 4 code points: ACK with the #of REs/RBs reduced by X1, ACK with the #of REs/RBs reduced by Y1, NACK with the #of REs/RBs increased by X2, or NACK with the #of REs/RBs increased by Y2. While this example does not include a DTX code point, other examples could include DTX and possibly remove one of the ACK or NACK code points.

In the example shown in FIG. 13C, the current number of REs could be reduced for ACK feedback (e.g., if the gNB is not too concerned about errors), by using a positive value for X1 or Y1. This may be the case, for example, if ACK indicates relatively high SNR, and there may be extra REs that the gNB can use for other UEs. On the other hand, in the event of a NACK, more REs/RBs may be used to increase SNR (so X2 and/or Y2 may likely be positive values). Any of the values (X1, Y1, X2, Y2) may be set to zero to indicate the same number of REs/RBs. In some cases, UE may be configured with values for X1, Y1, X2, and Y2 (e.g., via RRC or MAC CE signaling).

How these values may be used to indicate a range of REs/RBs for quantized feedback may be understood by considering an example that assumes values for X2 of 7, Y2 of 10, and that a current number of RBs of 5. If a desired number of RBs is 6, an extra RB is needed, so X2 may be used (so $b_0 b_1$ may be set to '10' to feedback 12 RBs). If the desired is 14 on the other hand, Y2 may be used (so $b_0 b_1$ may be set to '11' to feed back 15 RBs). If more than 15 RBs were desired, larger values for X2 and/or Y2 may be configured.

Example Communications Devices

Figure 14:
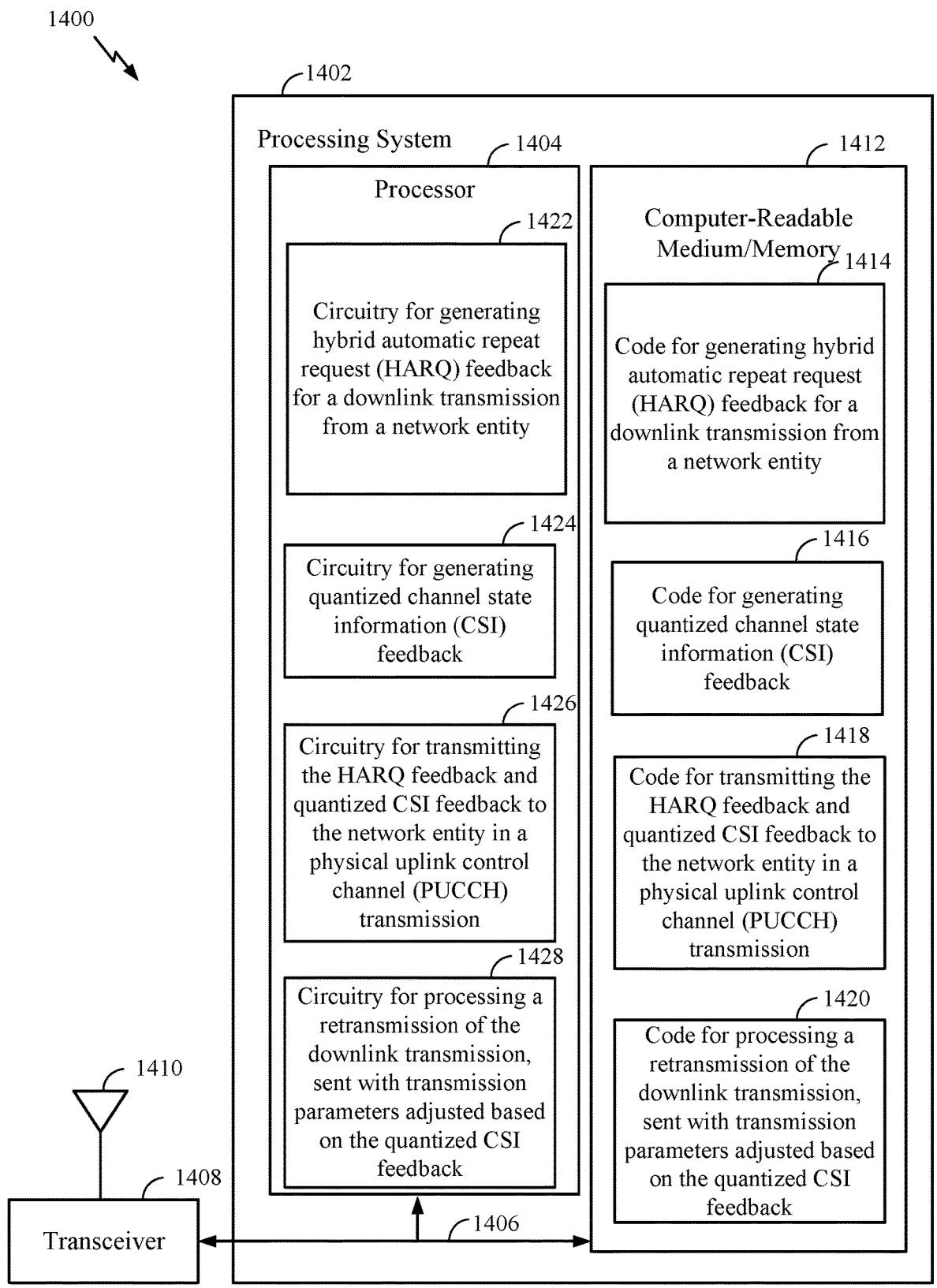
FIGS. 14 and 15 illustrate communications devices that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 7. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 7, or other operations for performing the various techniques discussed herein. In certain aspects, computer-readable medium/memory 1412 stores code 1414 for generating hybrid automatic repeat request (HARQ) feedback for a downlink transmission from a network entity; code 1416 for generating quantized channel state information (CSI) feedback; code 1418 for transmitting the HARQ feedback and quantized CSI feedback to the network entity in a physical uplink control channel (PUCCH) transmission; and code 1420 for processing a retransmission of the downlink transmission, sent with transmission parameters adjusted based on the quantized CSI feedback if the HARQ feedback indicates a decoding failure. In certain aspects, the processor 1404 has circuitry configured to implement the code stored in the computer-readable medium/memory 1412. The processor 1404 includes circuitry 1422 for generating hybrid automatic repeat request (HARQ) feedback for a downlink transmission from a network entity; circuitry 1424 for generating quantized channel state information (CSI) feedback; circuitry 1426 for transmitting the HARQ feedback and quantized CSI feedback to the network entity in a physical uplink control channel (PUCCH) transmission; and circuitry 1428 for processing a retransmission of the downlink transmission, sent with transmission parameters adjusted based on the quantized CSI feedback if the HARQ feedback indicates a decoding failure.

Figure 15:
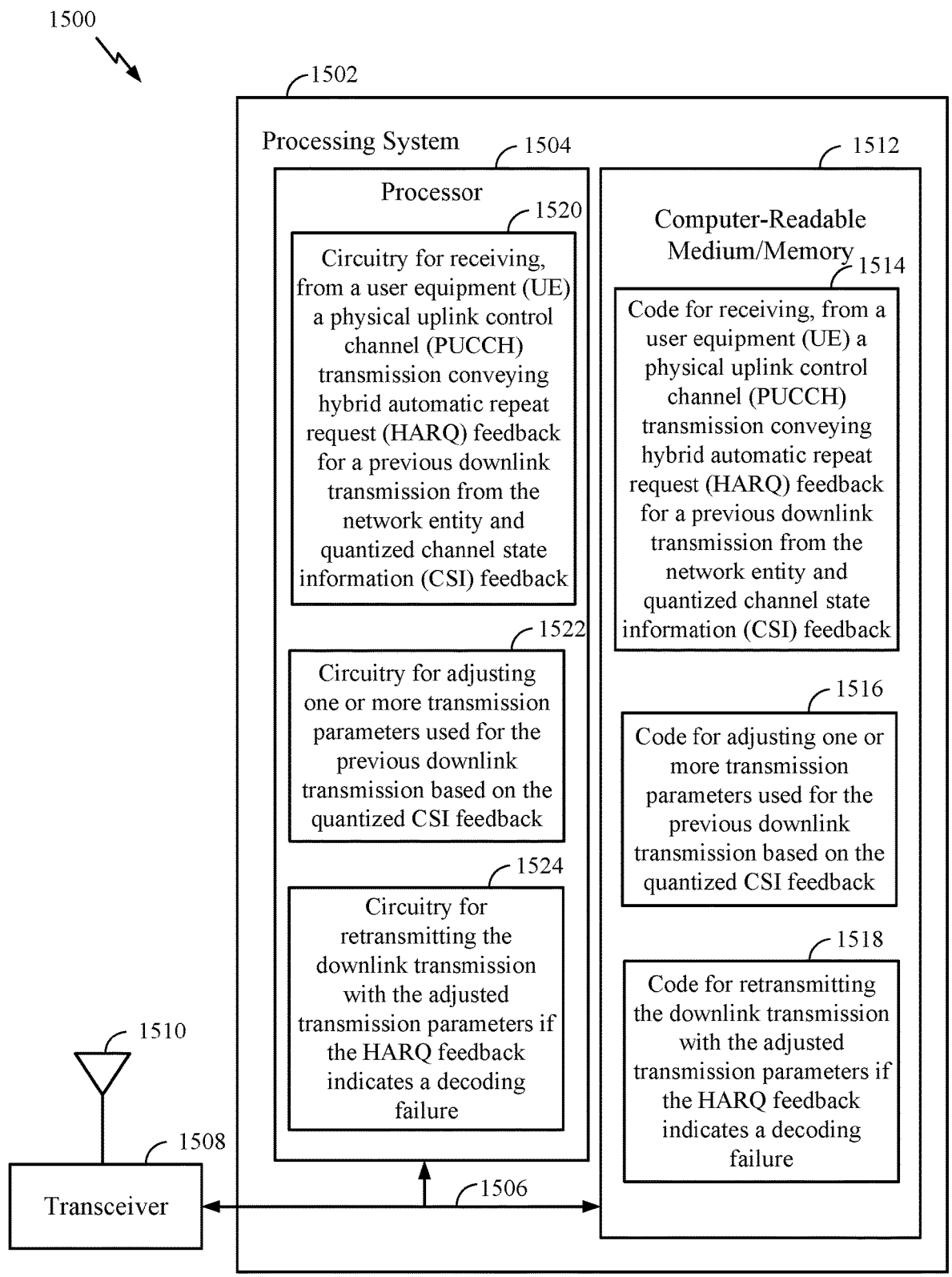

FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 8, or other operations for performing the various techniques discussed herein. In certain aspects, computer-readable medium/memory 1512 stores code 1514 for receiving, from a user equipment (UE) a physical uplink control channel (PUCCH) transmission conveying hybrid automatic repeat request (HARQ) feedback for a previous downlink transmission from the network entity and quantized channel state information (CSI) feedback; code 1516 for adjusting one or more transmission parameters used for the previous downlink transmission based on the quantized CSI feedback; and code 1518 for retransmitting the downlink transmission with the adjusted transmission parameters if the HARQ feedback indicates a decoding failure. In certain aspects, the processor 1504 has circuitry configured to implement the code stored in the computer-readable medium/memory 1512. The processor 1504 includes circuitry 1520 for receiving, from a user equipment (UE) a physical uplink control channel (PUCCH) transmission conveying hybrid automatic repeat request (HARQ) feedback for a previous downlink transmission from the network entity and quantized channel state information (CSI) feedback; circuitry 1522 for adjusting one or more transmission parameters used for the previous downlink transmission based on the quantized CSI feedback; and circuitry 1524 for retransmitting the downlink transmission with the adjusted transmission parameters if the HARQ feedback indicates a decoding failure.

Example Aspects

Aspect 1: A method for wireless communications by a user equipment (UE), comprising: generating hybrid automatic repeat request (HARQ) feedback for a downlink transmission from a network entity; generating quantized channel state information (CSI) feedback; transmitting the HARQ feedback and quantized CSI feedback to the network entity in a physical uplink control channel (PUCCH) transmission; and processing a retransmission of the downlink transmission, sent with transmission parameters adjusted based on the quantized CSI feedback if the HARQ feedback indicates a decoding failure.

Aspect 2: The method of Aspect 1, wherein the quantized CSI feedback indicates one or more values for parameters relative to parameters reported in a periodic CSI feedback report.

Aspect 3: The method of any one of Aspects 1-2, wherein: the quantized CSI feedback comprises one or more bits that indicate a change to a modulation order.

Aspect 4: The method of Aspect 3, wherein a mapping of the one or more bits to different modulation order depends, at least in part, on modulation orders allowed in a channel quality information (CQI) table used by the UE and network entity.

Aspect 5: The method of Aspect 3, wherein generating quantized CSI feedback comprises: computing an average signal to interference and noise ratio (SINR) per layer; computing a spectral efficiency; using a CQI to efficiency table to obtain a CQI value; and indicating, with the one or more bits, a modulation order corresponding to the CQI value obtained from the CQI to efficiency table.

Aspect 6: The method of Aspect 3, wherein the quantized CSI feedback indicates at least one additional bit for the network entity to use when adjusting transmission parameters for the retransmission.

Aspect 7: The method of Aspect 6, wherein: the network entity uses the additional bit to select a target code rate associate with the indicated modulation order.

Aspect 8: The method of Aspect 7, wherein the additional bit is provided as part of combination of bits that indicate the HARQ feedback conveys a negative acknowledgment (NACK) or a positive acknowledgment (ACK).

Aspect 9: The method of Aspect 7, wherein the additional bit indicates a range of target code rates from which the network entity makes the selection.

Aspect 10: The method of Aspect 6, wherein a value of the additional bit indicates additional resource elements requested by the UE.

Aspect 11: The method of Aspect 10, wherein the additional bit is provided as part of combination of bits that indicate the HARQ feedback conveys a NACK.

Aspect 12: The method of any one of Aspects 1-11, wherein the quantized CSI feedback indicates an adjustment to a number of resource elements (REs) or resource blocks (RBs) relative to a current number of REs or RBs.

Aspect 13: The method of any one of Aspects 1-12, further comprising: receiving signaling indicating a set of values for the adjustment; and wherein a combination of bits indicates the HARQ feedback and one of the set of values for the adjustment.

Aspect 14: A method for wireless communications by a network entity, comprising: receiving, from a user equipment (UE) a physical uplink control channel (PUCCH) transmission conveying hybrid automatic repeat request (HARQ) feedback for a previous downlink transmission from the network entity and quantized channel state information (CSI) feedback; adjusting one or more transmission parameters used for the previous downlink transmission based on the quantized CSI feedback; and retransmitting the downlink transmission with the adjusted transmission parameters if the HARQ feedback indicates a decoding failure.

Aspect 15: The method of Aspect 14, wherein the quantized CSI feedback indicates one or more values for parameters relative to parameters reported by the UE in a periodic CSI feedback report.

Aspect 16: The method of any one of Aspects 14-15, wherein: the quantized CSI feedback comprises one or more bits that indicate a change to a modulation order; and the network entity adjusts one or more transmission parameters to maintain a transport block size (TBS) after adjusting the modulation order per the quantized CSI feedback.

Aspect 17: The method of Aspect 16, wherein a mapping of the one or more bits to different modulation order depends, at least in part, on modulation orders allowed in a CQI table used by the UE and network entity.

Aspect 18: The method of Aspect 16, wherein adjusting one or more transmission parameters to maintain a transport block size (TBS) after adjusting the modulation order per the quantized CSI feedback comprises: selecting, from a table, one of a plurality of target code rates associated with the modulation order and indicated by the one or more bits.

Aspect 19: The method of Aspect 18, wherein the network entity selects: a lowest target code rate associated with the modulation order and indicated by the one or more bits; a highest target code rate associated with the modulation order and indicated by the one or more bits; or a target code rate associated with the modulation order and indicated by the one or more bits that is between the lowest target code rate and the highest target code rate.

Aspect 20: The method of Aspect 18, wherein: the quantized CSI feedback comprises at least one additional bit; and the network entity selects a target code rate associate with the indicated modulation order based, at least in part, on the additional bit.

Aspect 21: The method of Aspect 20, wherein the additional bit is provided as part of combination of bits that indicate the HARQ feedback conveys a NACK.

Aspect 22: The method of Aspect 20, wherein the additional bit indicates a range of target code rates from which the network entity makes the selection.

Aspect 23: The method of Aspect 16, wherein adjusting one or more transmission parameters to maintain a transport block size (TBS) after adjusting the modulation order per the quantized CSI feedback comprises: adjusting a number of resources based, at least in part, on the number of resources, code rate, and modulation order used for the previous downlink transmission, the modulation order and indicated by the one or more bits, code rate selected for the retransmission, and at least one addition bit of the quantized CSI feedback.

Aspect 24: The method of Aspect 23, wherein the additional bit is provided as part of combination of bits that indicate the HARQ feedback conveys a negative acknowledgment (NACK) or a positive acknowledgment (ACK).

Aspect 25: The method of any one of Aspects 14-24, wherein the quantized CSI feedback indicates an adjustment to a number of resource elements (REs) or resource blocks (RBs) relative to a current number of REs or RBs.

Aspect 26: The method of any one of Aspects 14-25, further comprising: transmitting, to the UE, signaling indicating a set of values for the adjustment; and wherein the PUCCH transmission conveys a combination of bits that indicates the HARQ feedback and one of the set of values for the adjustment.

Aspect 27: An apparatus, comprising: a memory comprising executable instructions; and one or more processors configured to execute the executable instructions and cause the apparatus to perform a method in accordance with any one of Aspects 1-26.

Aspect 28: An apparatus, comprising means for performing a method in accordance with any one of Aspects 1-26.

Aspect 29: A non-transitory computer-readable medium comprising executable instructions that, when executed by one or more processors of an apparatus, cause the apparatus to perform a method in accordance with any one of Aspects 1-26.

Aspect 30: A computer program product embodied on a computer-readable storage medium comprising code for performing a method in accordance with any one of Aspects 1-26.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. For example, processors 458, 464, 466, and/or controller/processor 480 of the UE 120 and/or processors 420, 430, 438, and/or controller/processor 440 of the BS 110 shown in FIG. 4 may be configured to perform operations 700 of FIG. 7 and/or operations 800 of FIG. 8.

Means for receiving may include a receiver (such as one or more antennas or receive processors) illustrated in FIG. 4. Means for transmitting may include a transmitter (such as one or more antennas or transmit processors) illustrated in FIG. 4. Means for determining, means for processing, means for treating, and means for applying may include a processing system, which may include one or more processors, such as processors 458, 464, 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, instructions for performing the operations described herein and illustrated in FIGS. 7-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   generating hybrid automatic repeat request (HARQ) feedback for a downlink transmission from a network entity;
   generating quantized channel state information (CSI) feedback indicating at least an adjustment to at least one of a number of resource elements (REs) or resource blocks (RBs) relative to a current number of REs or RBs used for the downlink transmission for a retransmission of the downlink transmission after a negative acknowledgment (NACK) corresponding to the downlink transmission, wherein the quantized CSI feedback further indicates an amount of the at least one of the number of REs or RBs relative to the current number of REs or RBs for the retransmission of the downlink transmission;
   transmitting the HARQ feedback and the quantized CSI feedback to the network entity in a physical uplink control channel (PUCCH) transmission; and
   processing the retransmission of the downlink transmission, sent with transmission parameters adjusted based on the quantized CSI feedback if the HARQ feedback indicates a decoding failure.

2. The method of claim 1, wherein the quantized CSI feedback indicates one or more values for parameters relative to parameters reported in a periodic CSI feedback report.

3. The method of claim 1, wherein:
   the quantized CSI feedback comprises one or more bits that indicate a change to a modulation order.

4. The method of claim 3, wherein a mapping of the one or more bits to different modulation order depends, at least in part, on modulation orders allowed in a channel quality information (CQI) table used by the UE and the network entity.

5. The method of claim 3, wherein the generating the quantized CSI feedback comprises:
   computing an average signal to interference and noise ratio (SINR) per layer;
   computing a spectral efficiency;
   using a CQI to efficiency table to obtain a CQI value; and
   indicating, with the one or more bits, a modulation order corresponding to the CQI value obtained from the CQI to efficiency table.

6. The method of claim 3, wherein the quantized CSI feedback indicates at least one additional bit for the network entity to use when adjusting transmission parameters for the retransmission.

7. The method of claim 6, wherein:
   the network entity uses the additional bit to select a target code rate associate with the indicated modulation order.

8. The method of claim 7, wherein the additional bit is provided as part of combination of bits that indicate the HARQ feedback conveys a negative acknowledgment (NACK) or a positive acknowledgment (ACK).

9. The method of claim 7, wherein the additional bit indicates a range of target code rates from which the network entity makes the selection.

10. The method of claim 6, wherein a value of the additional bit indicates additional REs requested by the UE.

11. The method of claim 10, wherein the additional bit is provided as part of combination of bits that indicate the HARQ feedback conveys a negative acknowledgment (NACK).

12. The method of claim 1, further comprising:
    receiving signaling indicating a set of values for the adjustment of the transmission parameters; and
    wherein a combination of bits indicates the HARQ feedback and one of the set of values for the adjustment of the transmission parameters.

13. A method for wireless communications by a network entity, comprising:
    receiving, from a user equipment (UE), a physical uplink control channel (PUCCH) transmission conveying hybrid automatic repeat request (HARQ) feedback for a previous downlink transmission from the network entity and quantized channel state information (CSI) feedback indicating at least an adjustment to at least one of a number of resource elements (REs) or resource blocks (RBs) relative to a current number of REs or RBs used for the previous downlink transmission for a retransmission of the previous downlink transmission after a negative acknowledgment (NACK) corresponding to the previous downlink transmission, wherein the quantized CSI feedback further indicates an amount of the at least one of the number of REs or RBs relative to the current number of REs or RBs for the retransmission of the previous downlink transmission;
    adjusting one or more transmission parameters used for the previous downlink transmission based on the quantized CSI feedback; and
    retransmitting the previous downlink transmission with the adjusted one or more transmission parameters if the HARQ feedback indicates a decoding failure.

14. The method of claim 13, wherein the quantized CSI feedback indicates one or more values for parameters relative to parameters reported by the UE in a periodic CSI feedback report.

15. The method of claim 13, wherein:
   the quantized CSI feedback comprises one or more bits that indicate a change to a modulation order; and
   the network entity adjusts one or more transmission parameters to maintain a transport block size (TBS) after adjusting the modulation order per the quantized CSI feedback.

16. The method of claim 15, wherein a mapping of the one or more bits to different modulation order depends, at least in part, on modulation orders allowed in a CQI table used by the UE and the network entity.

17. The method of claim 15, wherein the adjusting the one or more transmission parameters to maintain the TBS after adjusting the modulation order per the quantized CSI feedback comprises:
   selecting, from a table, one of a plurality of target code rates associated with the modulation order and indicated by the one or more bits.

18. The method of claim 17, wherein the network entity selects:
   a lowest target code rate associated with the modulation order and indicated by the one or more bits;
   a highest target code rate associated with the modulation order and indicated by the one or more bits; or
   a target code rate associated with the modulation order and indicated by the one or more bits that is between the lowest target code rate and the highest target code rate.

19. The method of claim 17, wherein:
   the quantized CSI feedback comprises at least one additional bit; and
   the network entity selects a target code rate associate with the indicated modulation order based, at least in part, on the additional bit.

20. The method of claim 19, wherein the additional bit is provided as part of a combination of bits that indicate the HARQ feedback conveys a negative acknowledgment (NACK).

21. The method of claim 19, wherein the additional bit indicates a range of target code rates from which the network entity makes the selection.

22. The method of claim 15, wherein the adjusting the one or more transmission parameters to maintain the TBS after adjusting the modulation order per the quantized CSI feedback comprises:
   adjusting a number of resources based, at least in part, on the number of resources, code rate, and modulation order used for the previous downlink transmission, the modulation order and indicated by the one or more bits, code rate selected for the retransmission, and at least one addition bit of the quantized CSI feedback.

23. The method of claim 22, wherein the additional bit is provided as part of a combination of bits that indicate the HARQ feedback conveys a negative acknowledgment (NACK) or a positive acknowledgment (ACK).

24. The method of claim 13, further comprising:
   transmitting, to the UE, signaling indicating a set of values for the adjustment of the transmission parameters; and
   wherein the PUCCH transmission conveys a combination of bits that indicates the HARQ feedback and one of the set of values for the adjustment of the transmission parameters.

25. An apparatus for wireless communications by a user equipment (UE), comprising:
   a memory comprising instructions; and
   one or more processors configured to execute the instructions and cause the apparatus to:
      generate hybrid automatic repeat request (HARQ) feedback for a downlink transmission from a network entity;
      generate quantized channel state information (CSI) feedback indicating at least an adjustment to at least one of a number of resource elements (REs) or resource blocks (RBs) relative to a current number of REs or RBs used for the downlink transmission for a retransmission of the downlink transmission after a negative acknowledgment (NACK) corresponding to the downlink transmission, wherein the quantized CSI feedback further indicates an amount of the at least one of the number of REs or RBs relative to the current number of REs or RBs for the retransmission of the downlink transmission;
      transmit the HARQ feedback and the quantized CSI feedback to the network entity in a physical uplink control channel (PUCCH) transmission; and
      process the retransmission of the downlink transmission, sent with transmission parameters adjusted based on the quantized CSI feedback if the HARQ feedback indicates a decoding failure.

26. The method of claim 22, wherein the quantized CSI feedback indicates one or more values for parameters relative to parameters reported in a periodic CSI feedback report.

27. The method of claim 22, wherein:
   the quantized CSI feedback comprises one or more bits that indicate a change to a modulation order.

28. An apparatus for wireless communications by a network entity, comprising:
   a memory comprising instructions; and
   one or more processors configured to execute the instructions and cause the apparatus to:
      receive, from a user equipment (UE), a physical uplink control channel (PUCCH) transmission conveying hybrid automatic repeat request (HARQ) feedback indicating a decoding failure of a previous downlink transmission from the network entity and quantized channel state information (CSI) feedback indicating at least an adjustment to at least one of a number of resource elements (REs) or resource blocks (RBs) relative to a current number of REs or RBs used for the previous downlink transmission for a retransmission of the previous downlink transmission after a negative acknowledgment (NACK) corresponding to the previous downlink transmission, wherein the quantized CSI feedback further indicates an amount of the at least one of the number of REs or RBs relative to the current number of REs or RBs for the retransmission of the previous downlink transmission;
      adjust one or more transmission parameters used for the previous downlink transmission based on the quantized CSI feedback; and
      retransmit the previous downlink transmission with the adjusted one or more transmission parameters if the HARQ feedback indicates a decoding failure.

* * * * *